US010084654B2

(12) United States Patent
LaBrie et al.

(10) Patent No.: US 10,084,654 B2
(45) Date of Patent: Sep. 25, 2018

(54) POLICY DRIVEN NETWORK PROBE FOR DETERMINING INTERNET PROTOCOL SELECTION

(71) Applicant: International Business Machines Corporation, Armonk, NY (US)

(72) Inventors: Robert G. LaBrie, Tucson, AZ (US); Wayne W. Sun, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/994,101

(22) Filed: Jan. 12, 2016

(65) Prior Publication Data
US 2017/0201422 A1      Jul. 13, 2017

(51) Int. Cl.
  *H04L 12/50*   (2006.01)
  *H04L 12/24*   (2006.01)
  *H04L 12/26*   (2006.01)

(52) U.S. Cl.
  CPC .......... *H04L 41/0893* (2013.01); *H04L 43/08* (2013.01)

(58) Field of Classification Search
  CPC ...................................... H04L 43/08
  USPC ........................................ 370/252
  See application file for complete search history.

(56) References Cited

U.S. PATENT DOCUMENTS

| 8,788,576 B2* | 7/2014 | Chincisan ......... H04L 12/40013 709/203 |
| 2014/0115093 A1 | 4/2014 | Dirstine et al. |
| 2014/0379778 A1* | 12/2014 | Mahajan ................. H04L 67/10 709/203 |
| 2016/0080241 A1* | 3/2016 | Rocha De Maria .... H04L 43/50 370/252 |
| 2017/0201601 A1 | 7/2017 | Bright et al. |

OTHER PUBLICATIONS

Bright et al., U.S. Appl. No. 14/994,069, filed Jan. 12, 2016.
IBM, "Shared Memory Communications over RDMA (SMC-R) Linux Overview," IBM Corporation, Nov. 2014, pp. 1-29.
Labrie et al., U.S. Appl. No. 15/994,819, filed May 31, 2018.

* cited by examiner

*Primary Examiner* — Dang Ton
(74) *Attorney, Agent, or Firm* — Zilka-Kotab, P.C.

(57) ABSTRACT

A computer-implemented method, according to one embodiment, includes: transferring data over a network using a first mode, at least one of randomly, periodically and continuously determining network performance characteristics during the transferring, applying a policy to the network performance characteristics determined during the transferring, continuing to use the first mode of data transfer in response to a result of applying the policy mandating continued use of the first mode, selecting a second mode of data transfer in response to the result of applying the policy mandating use of the second mode, and transferring data over the network using the second mode in response to selecting the second mode.

13 Claims, 5 Drawing Sheets

POLICY DRIVEN NETWORK PROBE FOR DETERMINING INTERNET PROTOCOL SELECTION

BACKGROUND

The present invention relates to data transfers on a network, and more specifically, this invention relates to more efficiently transfer data between different locations using a network.

Wide area and other networks allow for data to potentially be stored in multiple different remote storage sites and/or across multiple storage devices. Despite being stored in various locations, all, subsets, some, etc. of the data included in a data storage system may be accessed from a plurality of different locations, e.g., terminals. For example, computer systems using wide area networks for data transfer may be located in different locations which are separated by varying distances. While this separation allows for disaster recovery should one of the computer systems fail, the distance between the computer systems may also introduce inefficiency when transferring data between storage locations. Moreover, these inefficiencies tend to be exacerbated as the amount of data transferred between storage locations increases over time.

SUMMARY

A computer-implemented method, according to one embodiment, includes: transferring data over a network using a first mode, at least one of randomly, periodically and continuously determining network performance characteristics during the transferring, applying a policy to the network performance characteristics determined during the transferring, continuing to use the first mode of data transfer in response to a result of applying the policy mandating continued use of the first mode, selecting a second mode of data transfer in response to the result of applying the policy mandating use of the second mode, and transferring data over the network using the second mode in response to selecting the second mode.

A computer program product for selecting a mode of data transfer based on application of a policy to network performance characteristics, according to another embodiment, includes a computer readable storage medium having program instructions embodied therewith, the program instructions executable by a computer to cause the computer to: transfer, by the computer, data over a network using a first mode, at least one of randomly, periodically and continuously determine, by the computer, network performance characteristics during the transferring, apply, by the computer, a policy to the network performance characteristics determined during the transferring, continue to use, by the computer, the first mode of data transfer in response to a result of applying the policy mandating continued use of the first mode, select, by the computer, a second mode of data transfer in response to the result of applying the policy mandating use of the second mode, and transfer, by the computer, data over the network using the second mode in response to selecting the second mode.

A system, according to yet another embodiment, includes: a processor and logic integrated with and/or executable by the processor, the logic being configured to: create or retrieve, by the processor, a policy, wherein creating the policy includes: selecting policy attributes for the policy, setting values for the policy attributes, associating the policy attributes with multiple modes of network data transfer, determine, by the processor, network performance characteristics, apply, by the processor, the policy to the network performance characteristics, select, by the processor, a first mode of data transfer based on application of the policy to the network performance characteristics, transfer, by the processor, data over the network using the first mode, at least one of randomly, periodically and continuously determine, by the processor, network performance characteristics during the transferring, apply, by the processor, the policy to the network performance characteristics determined during the transferring, continue to use, by the processor, the first mode of data transfer in response to a result of applying the policy mandating continued use of the first mode, select, by the processor, a second mode of data transfer in response to the result of applying of the policy mandating use of the second mode, and transfer, by the processor, data over the network using the second mode in response to selecting the second mode.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically switch between modes by which data may be transferred between locations using a network. By programmatically probing the network performance characteristics and/or dynamically selecting which data transfer mode to implement, efficient data transfer rates may be achieved throughout a data transfer period.

In one general embodiment, a computer-implemented method includes: transferring data over a network using a first mode, at least one of randomly, periodically and continuously determining network performance characteristics during the transferring, applying a policy to the network performance characteristics determined during the transferring, continuing to use the first mode of data transfer in response to a result of applying the policy mandating continued use of the first mode, selecting a second mode of data transfer in response to the result of applying the policy mandating use of the second mode, and transferring data over the network using the second mode in response to selecting the second mode.

In another general embodiment, a computer program product for selecting a mode of data transfer based on application of a policy to network performance characteristics, includes a computer readable storage medium having program instructions embodied therewith, the program instructions executable by a computer to cause the computer to: transfer, by the computer, data over a network using a first mode, at least one of randomly, periodically and continuously determine, by the computer, network performance characteristics during the transferring, apply, by the computer, a policy to the network performance characteristics determined during the transferring, continue to use, by the computer, the first mode of data transfer in response to a result of applying the policy mandating continued use of the first mode, select, by the computer, a second mode of data transfer in response to the result of applying the policy mandating use of the second mode, and transfer, by the computer, data over the network using the second mode in response to selecting the second mode.

In yet another general embodiment, a system includes: a processor and logic integrated with and/or executable by the processor, the logic being configured to: create or retrieve, by the processor, a policy, wherein creating the policy includes: selecting policy attributes for the policy, setting values for the policy attributes, associating the policy attributes with multiple modes of network data transfer, determine, by the processor, network performance characteristics, apply, by the processor, the policy to the network performance characteristics, select, by the processor, a first mode of data transfer based on application of the policy to the network performance characteristics, transfer, by the processor, data over the network using the first mode, at least one of randomly, periodically and continuously determine, by the processor, network performance characteristics during the transferring, apply, by the processor, the policy to the network performance characteristics determined during the transferring, continue to use, by the processor, the first mode of data transfer in response to a result of applying the policy mandating continued use of the first mode, select, by the processor, a second mode of data transfer in response to the result of applying of the policy mandating use of the second mode, and transfer, by the processor, data over the network using the second mode in response to selecting the second mode.

Figure 1:
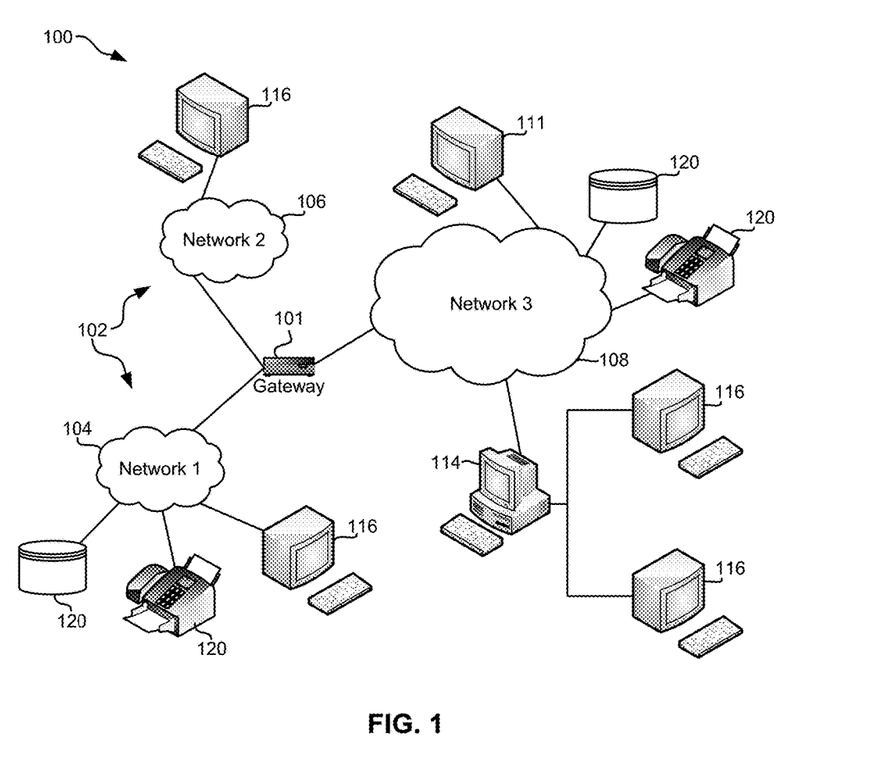
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
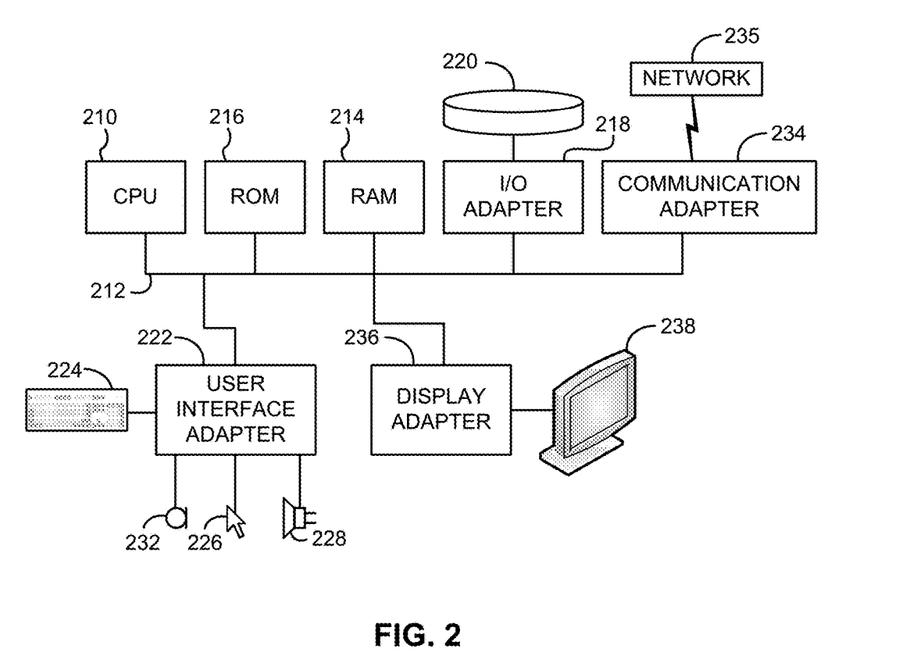
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
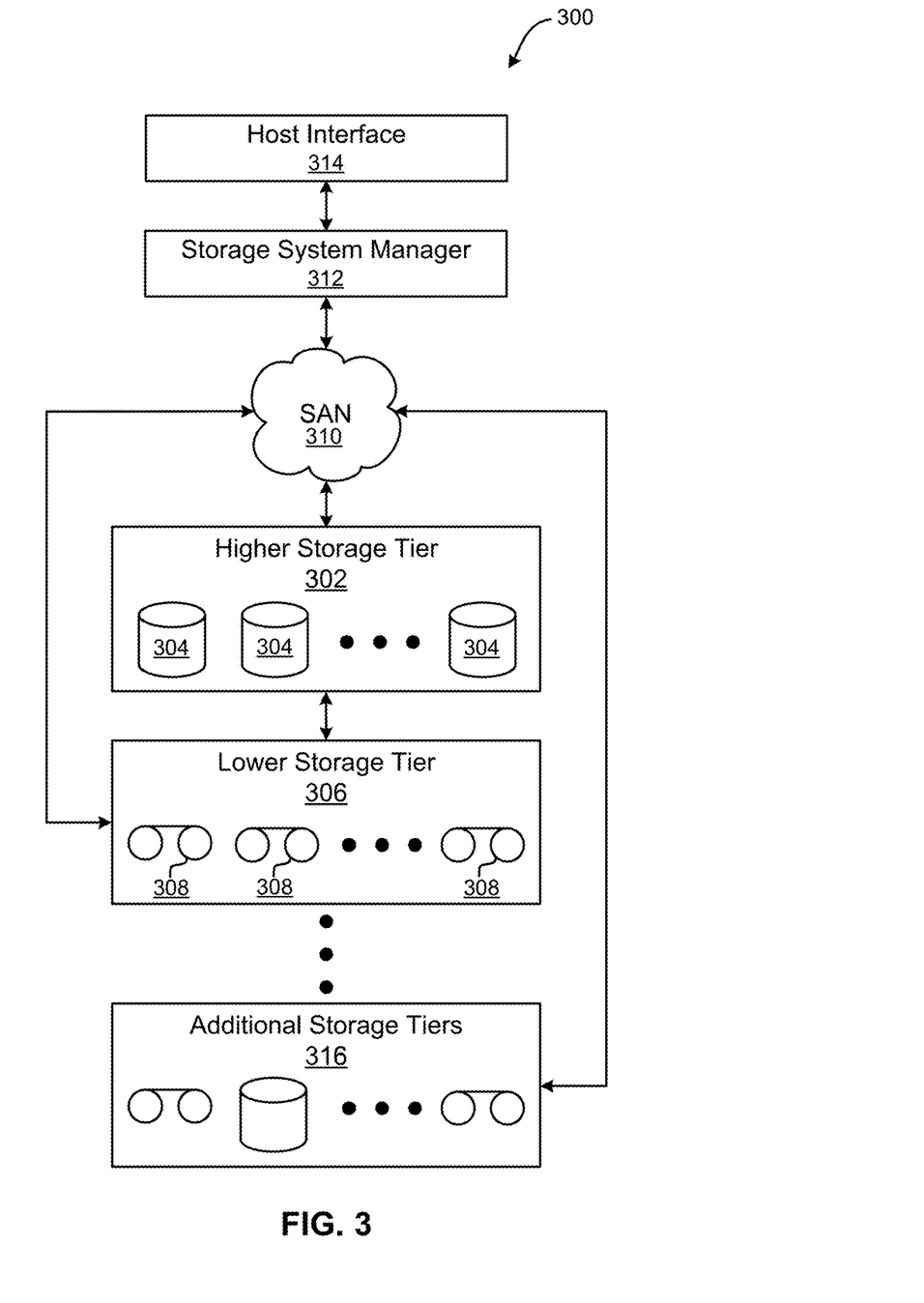
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, networks allow for data to potentially be stored in multiple different storage sites and/or across multiple storage devices. Despite being stored in various locations, all, subsets, some, etc. of the data included in a data storage system may be accessed from a plurality of different locations, e.g., terminals, remote computers, etc. For example, computer systems used in redundant data storage deployments may be located in different locations which are separated by varying distances.

While this separation allows for disaster recovery should one of the computer systems fail, the distance between the computer systems tends to introduce inefficiency when transferring data between storage locations. Moreover, these inefficiencies tend to be exacerbated as the amount of data transferred between storage locations increases over time.

Data storage network architectures (e.g., application programs) may implement a Transmission Control Protocol/Internet Protocol (TCP/IP) transfer method which allows for data to be transferred between locations with reliability, availability and serviceability attributes. However, the added reliability of TCP/IP transfer methods also results in slower data transfer rates. Alternatively, wide area network (WAN) accelerators, e.g. User datagram protocol (UDP), are available as a method to transfer data more quickly between data storage locations. Although WAN accelerators may be used to meet network throughput standards, doing so may come at a cost, as additional hardware and/or software may be needed to support a WAN accelerator.

In previous data storage networks, a specific data transfer method is selected (e.g., by a network administrator) prior to conducting the data transfer, based on the situation. However, although previous data storage networks may be able to determine and select which transfer method is desirable to use for a given situation, once the selection is made, the application data transfer is committed to using this chosen data transfer method until the transfer is complete. Thus, should changes occur after a data transfer method has been selected, previous data storage networks continue to transfer data, albeit over an inefficient connection. In other words, if the network changes while in session, the currently implemented transfer method may no longer be optimal given the updated network performance characteristics.

For example, a remote application server may have a large amount of data to send to a datacenter application server. Before the remote application program begins moving data to the datacenter application server, previous data storage networks establish a network configuration which determines whether to route the application data using a TCP/IP transfer method or a WAN accelerator for best performance. Again, once the transfer method has been selected and the transfer has begun, the application continues transferring data using the selected method until the application data transfer is complete, or the application is canceled. Thus, even if the performance characteristics of the network change during the application transfer window, previous data storage networks will continue to transfer data albeit using a degraded network connection.

In sharp contrast, various embodiments described herein include the ability to dynamically switch between modes by which data may be transferred between locations, e.g., by programmatically probing the network performance characteristics and/or dynamically selecting which data transfer mode to implement, as will be described in further detail below.

Figure 4:
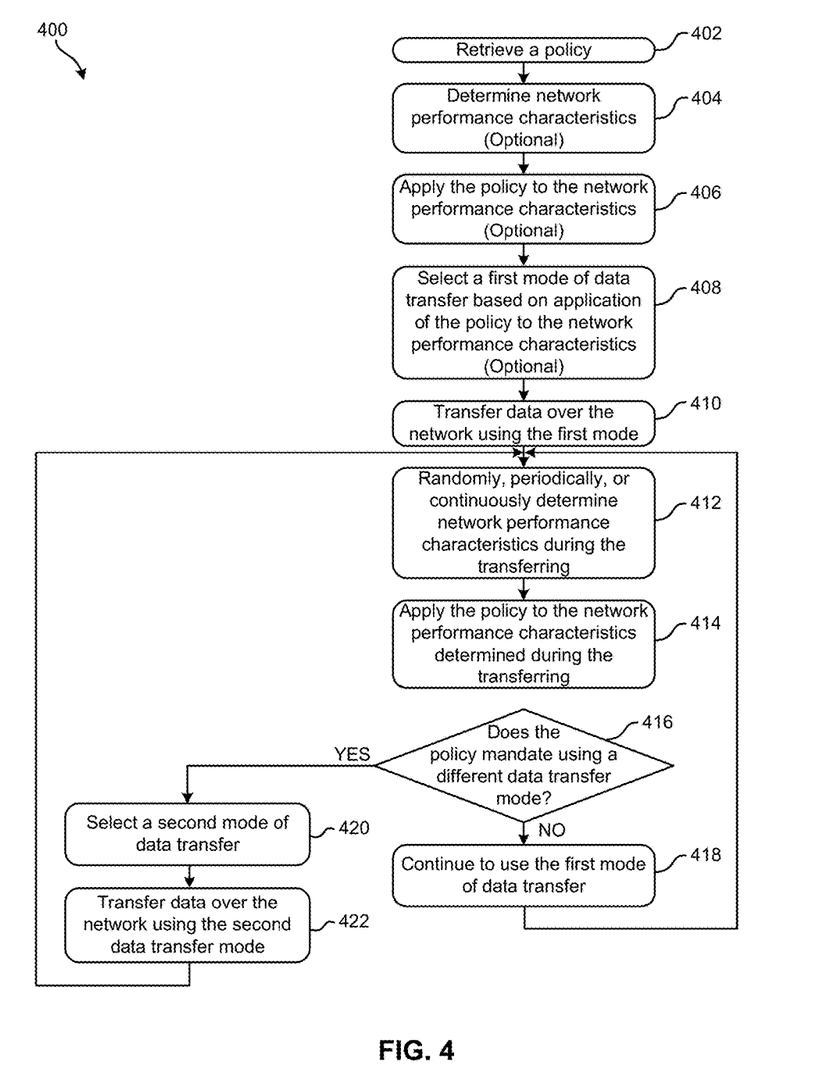
FIG. 4 is a flowchart of a method in accordance with one embodiment.

Referring now to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, a computer, etc., or some other device having one or more processors therein. Thus, in some embodiments, method 400 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, operation 402 of method 400 includes retrieving a policy which may be used to determine how data is transferred between locations in a network of known type, e.g., a Local Area Network (LAN), a WAN such as the internet and telephone networks, etc. Policies preferably include attributes which may be used to make decisions regarding which data transfer mode is desirable in a variety of different conditions. Once a policy is created, it may be applied to the performance characteristics of a network in order to determine a desired data transfer mode, e.g., see operations 406, 408 as will be described in further detail below.

By applying a policy to the performance of a data transfer operation, a transfer mode (e.g., method) may be selected and preferably deployed. Moreover, it is preferred that a policy is continually enforced for the duration of the data transfer session, as will be described in further detail below.

A policy may be retrieved from memory (e.g., from a lookup table) in response to a request, automatically, as a result of a previous operation, etc. Moreover, more than one policy may be stored in memory. Thus, retrieving a policy may include selecting a desired one of the policies, and retrieving the appropriate information pertaining to that policy.

It should be noted that although operation 402 includes retrieving a policy, e.g., from memory, in some instances a new (e.g., not previously created) policy may be desired. Thus, method 400 may alternatively include creating a policy in some embodiments, e.g., depending on desired policy attributes. Further description pertaining to creating a policy is provided below with reference to FIG. 5 which will be described in further detail below.

With continued reference to method 400, a mode used to transfer data may be determined based on network performance characteristics leading up to the transfer of data, e.g., as opposed to picking an arbitrary data transfer mode at the outset of the data transfer process, and updating the mode as the data is actually transferred. Accordingly, one or more of optional operations 404, 406, 408 may be used to determine a desired data transfer mode prior to transferring the data.

As shown, optional operation 404 includes determining network performance characteristics, while optional operation 406 includes applying the previously retrieved (or created) policy to the network performance characteristics. Moreover, optional operation 408 includes selecting a first mode of data transfer based on application of the policy to the network performance characteristics.

A mode of data transfer may include a desired protocol, data transfer method, etc. Exemplary modes of data transfer include TCP/IP, FASP, RAM acceleration protocols, embodiments implementing WAN technology, etc., or any other data transfer mode which would be apparent to one skilled in the art upon reading the present description.

Method 400 further includes transferring data over the network using the first mode. See operation 410. Again it should be noted that a first mode may be selected using different processes than those described in optional operations 404, 406, 408. For example, the first mode may be selected arbitrarily by a user, predetermined, determined by a controller based on characteristics of the network, etc., depending on the desired embodiment.

Although a first mode of data transfer has been selected and data is being transferred over the network as seen in operation 410 above, it is preferred that the performance of the network is monitored such that the mode of data transfer may be adjusted to match any changes in the performance. As mentioned above, previous data storage attempts have been unable to deviate from a data transfer mode selected at the outset of a data transfer operation, thereby exposing the network to the risk of significant data transfer inefficiencies resulting from changes to network performance. In sharp contrast, various embodiments described herein are able to monitor network performance, and adjust the mode by which data may be transferred accordingly.

As such, operation 412 includes at least one of randomly, periodically, and continuously determining network performance characteristics during the transferring of data over the network. With reference to the present description, the term "randomly determining network performance characteristics" may include determining the network performance characteristics upon request from a user, upon meeting a predetermined condition, when prompted by an algorithm, upon receiving a demand, etc., depending on the desired embodiment. Moreover, term "periodically determining network performance characteristics" may include determining the network performance characteristics after an amount of time has passed, after a number of operations have been performed, after an amount of data has been transferred, etc., depending on the desired embodiment. Furthermore, term "continuously determining network performance characteristics" may include determining the network performance characteristics in real time, at frequency with a lower period than when "periodically determining network performance characteristics", as often as processing abilities allow, etc., depending on the desired embodiment. It should also be noted that the rate at which the network performance characteristics are determined during a transferring of data over the network may vary during the transfer period, as desired.

Network performance characteristics may be obtained by probing the network for performance metrics (e.g., using one or more probes positioned in the network), collecting throughput measurements on existing data transfer connections, etc., as would be appreciated by one skilled in the art upon reading the present description. Moreover, the frequency at which the network performance characteristics are determined may depend on an amount of available bandwidth, a relative value associated with the data being transferred, predetermined conditions, receiving a request (e.g., from a user), a number of other data transfer operations being concurrently performed, etc.

According to an example, which is in no way intended to limit the invention, network performance characteristics associated with a data transfer mode implementing a TCP/IP session may be determined continuously during the transfer of data by conducting measurements and determining the throughput of data being transferred from a source location (e.g., server) to a target location.

Using performance data pertaining to existing data transfer connections (e.g., sessions) to control the continued transfer of data by updating the mode used to transfer the data is desirable as is may be performed without implementing additional components. Network performance characteristics may be determined without deploying additional session monitors to collect performance metrics. Moreover, network performance characteristic results are preferably stored in memory (e.g., a database) such that they may be retrieved and/or used at a later point in time.

With continued reference to FIG. 4, operation 414 includes applying the policy associated with the data transfer to the network performance characteristics determined in operation 412 during the transferring of the data. Upon examining the results produced by applying the policy to the network performance characteristics, further action may be determined. As mentioned above, network performance characteristics may change over time, and therefore the desired mode used to transfer the data may change as well. Thus, decision 416 determines whether the policy mandates using a different data transfer mode.

As previously mentioned, policies have attributes associated therewith which may be used to determine whether a data transfer mode which is currently implemented is desirable in view of the network's performance characteristics. Thus, decision 416 may include examining the network performance characteristics (or other information such as a time of day), and comparing the information with one or more of the attributes associated with the policy in place for the given data transfer. It follows that decision 416 may determine that the use of a different data transfer mode is mandated in response to detecting that one or more of the attributes have been met. Thus, threshold values associated with each of the attributes may be predetermined, calculated in real time, set by a user, etc., and stored in memory for subsequent use. It should be noted that a "threshold" is in no way intended to limit the invention. Rather than determining how a value relates to a threshold, equivalent determinations may be made, e.g., as to whether a value is within a predetermined range, having a value outside a predetermined range, having an absolute value above a threshold, having a value below a threshold, etc., depending on the desired approach.

Method 400 may proceed to operation 418 in response to determining that the policy does not mandate using a different data transfer mode. As shown, operation 418 includes continuing to use the first mode of data transfer. Thus, data may continue to be transferred using the current data transfer mode in response to a result of applying the policy to the current network performance characteristics, where the result mandates the continued use of the first data transfer mode. Following operation 418, method 400 may return to operation 412 where network performance characteristics may continue to be determined during the transferring of data over the network, whereby the subsequent operations may be repeated.

Alternatively, method 400 may proceed to operation 420 in response to determining that the policy does mandate using a different data transfer mode. Operation 420 includes selecting a second mode of data transfer, while operation 422 includes transferring data over the network using the second data transfer mode in response to selecting the second data transfer mode. Thus, data may be transferred using a different data transfer mode than before in response to a result of applying the policy to the current network performance characteristics, where the result mandates the use of a different data transfer mode.

According to an example, which is in no way intended to limit the invention, using a FASP transfer method for a period of time may exceed a specific policy attribute. Accordingly, decision 416 may determine that the policy indicates (e.g., mandates) that it is desired that a different data transfer mode is used. Accordingly, an application program may cause the FASP transfer method to relinquish performance of the data transfer to a TCP/IP transfer method. According to an approach, an application program may be able to determine and/or select a data transfer mode (e.g., method). Thus, an application program may be used to perform decision 416 and/or one or more of the operations 418, 420, 422, as would be appreciated by one skilled in the art. However, after some time, it may be determined that the rate at which data is being transferred using the TCP/IP transfer method is too slow, e.g., based on an amount of available bandwidth, a number of stalled transfer operations, etc. Therefore an application program may cause a switch from the TCP/IP transfer method back to the FASP transfer method for a remainder of the data transfer period.

Following operation 422, method 400 may return to operation 412 where network performance characteristics may continue to be determined during the transferring of data over the network, whereby the subsequent operations may be repeated. This cycle of returning to operation 412 may be performed any number of times during the data transfer period, e.g., depending on the desired embodiment. However, in some approaches, the frequency and/or number of times any one or more of the operations in method 400 are performed may be limited based on an available amount of processing power, an amount of data being transferred, an amount of time in a data transfer period, etc. In some approaches, it may be desirable to implement threshold logic having some level of hysteresis, e.g., to prevent the network from rapidly switching between data transfer modes. Accordingly, each time method 400 is performed may be separated by a number of code interval windows, e.g., every other, every third, every fourth, etc.; an amount of time; meeting a predetermined condition; requests; etc., depending on the desired embodiment.

In addition to the features described above, some embodiments may be able to receive and/or process specific requests pertaining to the mode used to perform a data transfer. It follows that in some approaches, a request to override the current policy may be received. In response to receiving the request, a controller may apply a mode of data transfer defined by the request. In some approaches, the request received may optionally be authenticated, e.g., by verifying a sender, to ensure security of the data transfer. Moreover, in some approaches, received requests may still be subject to failsafes which may be used to ensure requests received in error do not compromise the efficiency, security, etc., of the data transfer by selectively overriding (e.g., ignoring) requests when certain conditions are met.

Additionally, some embodiments may be able to implement further functionality in addition to the features described above. For example, in addition to being able to update a data transfer mode implemented during a data transfer, one embodiment may be able to limit the amount of bandwidth available to perform a given data transfer, prioritize certain data transfer operations, pause data transfer operations, etc. This added functionality may be determined by detecting certain attributes of interest which pertain to the implemented policy, as will soon become apparent.

As mentioned above, although operation 402 includes retrieving a policy, e.g., from memory, in some instances a new (e.g., not previously created) policy may be desired. Thus, method 400 may alternatively include creating a policy in some embodiments, e.g., depending on desired policy attributes. Referring momentarily to method 500 of FIG. 5, exemplary sub-processes which may be performed as a part of creating a policy are illustrated in accordance with one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Figure 5:
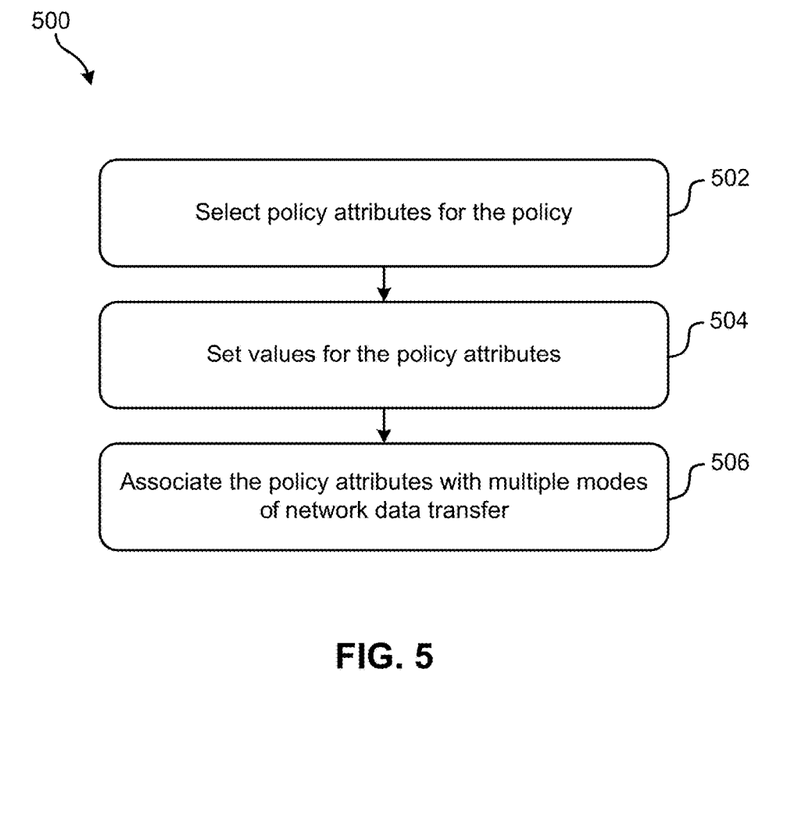
FIG. 5 is a flowchart of a method in accordance with one embodiment.

Each of the steps of the method 500 may be performed by any suitable component of the operating environment. For example, in various embodiments, the method 500 may be partially or entirely performed by a controller, a processor, a computer, etc., or some other device having one or more processors therein. Thus, in some embodiments, method 500 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown, creating a policy may include selecting policy attributes for the policy and setting values for the policy attributes. See sub-processes 502, 504 respectively.

Policies preferably include attributes which may be used to make decisions regarding which data transfer mode is desirable in a variety of different conditions. It follows that, depending on the attributes associated with a given policy, different steps may be taken during operation. According to various approaches, the policy attributes which may be selected for a given policy may include any one or more of the following: maximum network bandwidth, data object size threshold, period of time for scheduling, packet loss, network latency, high priority data transfer, node and/or storage pool (stgpool) name, performance metrics refresh rate, using bi-direction hybrid, using one-way hybrid, detection of throttling, minimum throughput, maximum throughput, a time of day during the data transfer, a measured throughput during the data transfer, etc. However in other approaches, the policy attributes the policy attributes which may be selected from for a given policy may include any two or more, at least three, four, five, multiple, etc. of the foregoing policy attributes. It should also be noted that although the attributes available for a given embodiment may be defined, the aforementioned list of policy attributes are in no way intended to limit the invention, and may include any policy attribute which would be apparent to one skilled in the art upon reading the present description.

Moreover, sub-process 506 includes associating the policy attributes with multiple modes (e.g., protocol, data transfer method, etc.) of network data transfer. Thus, as previously mentioned, a data transfer mode may be determined based on the attributes detected during operation while a given policy is enacted.

It follows that the various embodiments described herein include the ability to probe network performance to create one or more policies, one of which may be applied to the performance metrics resulting in transfer method to selection. Moreover, the added functionality of continuing to probe the network performance characteristics allows for the policy application to alter the mode used to transfer the data throughout a transfer session. Thus, the mode by which data is transferred (e.g., the data transfer method used) may change multiple times from one mode to another mode, and back again throughout the transfer session, e.g., until the session is complete.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
creating or retrieving a policy, wherein creating the policy includes:
selecting policy attributes for the policy,
setting values for the policy attributes, and
associating the policy attributes with multiple modes of network data transfer;
determining network performance characteristics;
applying the policy to the network performance characteristics;
selecting a first mode of data transfer based on application of the policy to the network performance characteristics;
transferring data over a network using the first mode;
at least one of randomly, periodically and continuously determining network performance characteristics during the transferring;
applying the policy to the network performance characteristics determined during the transferring;
continuing to use the first mode of data transfer in response to a result of applying the policy mandating continued use of the first mode;
selecting a second mode of data transfer in response to the result of applying the policy mandating use of the second mode;
transferring data over the network using the second mode in response to selecting the second mode;
receiving a request to override the policy;
authenticating the request; and
applying a mode of data transfer defined by the request in response to receiving the request,
wherein the policy attributes include a measured throughput during the data transfer,
wherein authenticating the request includes subjecting the request to a failsafe, wherein the failsafe ensures the request was not received in error.

2. The computer-implemented method of claim 1, wherein the network performance characteristics are continuously determined during the transferring.

3. The computer-implemented method of claim 1, wherein the policy attributes include at least two of:
a.) data object size threshold,
b.) period of time for scheduling,
c.) packet loss,
d.) high priority data transfer,
e.) node and/or storage pool name,
f.) performance metrics refresh rate,
g.) using bi-direction hybrid,
h.) using one-way hybrid,
i.) minimum throughput, and
j.) maximum throughput.

4. The computer-implemented method of claim 1, wherein the policy attributes include a time of day during the data transfer.

5. A computer program product for selecting a mode of data transfer based on application of a policy to network performance characteristics, the computer program product comprising a computer readable storage medium having program instructions embodied therewith, the program instructions executable by a computer to cause the computer to:
create or retrieve, by the computer, a policy, wherein creating the policy includes:
selecting policy attributes for the policy,
setting values for the policy attributes, and
associating the policy attributes with multiple modes of network data transfer;
determine, by the computer, network performance characteristics;
apply, by the computer, the policy to the network performance characteristics;
select, by the computer, a first mode of data transfer based on application of the policy to the network performance characteristics;
transfer, by the computer, data over a network using the first mode;
at least one of randomly, periodically and continuously determine, by the computer, network performance characteristics during the transferring;
apply, by the computer, the policy to the network performance characteristics determined during the transferring;
continue to use, by the computer, the first mode of data transfer in response to a result of applying the policy mandating continued use of the first mode;
select, by the computer, a second mode of data transfer in response to the result of applying the policy mandating use of the second mode;
transfer, by the computer, data over the network using the second mode in response to selecting the second mode;
receive, by the computer, a request to override the policy;
authenticate, by the computer, the request; and
apply, by the computer, a mode of data transfer defined by the request in response to receiving the request,
wherein the policy attributes include a measured throughput during the data transfer,
wherein authenticating the request includes subjecting the request to a failsafe, wherein the failsafe ensures the request was not received in error.

6. The computer program product of claim 5, wherein the network performance characteristics are continuously determined during the transferring.

7. The computer program product of claim 5, wherein the policy attributes include at least two of:
a.) data object size threshold,
b.) packet loss,
c.) high priority data transfer,
d.) node and/or storage pool name,
e.) performance metrics refresh rate,
f.) using bi-direction hybrid,
g.) using one-way hybrid,
h.) minimum throughput, and
i.) maximum throughput.

8. The computer program product of claim 5, wherein the policy attributes include a time of day during the data transfer.

9. The computer program product of claim 5, wherein the policy attributes include a measured throughput during the data transfer.

10. A system, comprising:
a processor and logic integrated with and/or executable by the processor, the logic being configured to:
create or retrieve, by the processor, a policy, wherein creating the policy includes:

selecting policy attributes for the policy,
setting values for the policy attributes, and
associating the policy attributes with multiple modes of network data transfer;
determine, by the processor, network performance characteristics;
apply, by the processor, the policy to the network performance characteristics;
select, by the processor, a first mode of data transfer based on application of the policy to the network performance characteristics;
transfer, by the processor, data over the network using the first mode;
at least one of randomly, periodically and continuously determine, by the processor, network performance characteristics during the transferring;
apply, by the processor, the policy to the network performance characteristics determined during the transferring;
continue to use, by the processor, the first mode of data transfer in response to a result of applying the policy mandating continued use of the first mode;
select, by the processor, a second mode of data transfer in response to the result of applying of the policy mandating use of the second mode;
transfer, by the processor, data over the network using the second mode in response to selecting the second mode;
receive, by the processor, a request to override the policy;
authenticate, by the processor, the request; and
apply, by the processor, a mode of data transfer defined by the request in response to receiving the request,
wherein the policy attributes include a measured throughput during the data transfer,
wherein authenticating the request includes subjecting the request to a failsafe, wherein the failsafe ensures the request was not received in error.

11. The system of claim 10, wherein the network performance characteristics are continuously determined during the transferring.

12. The system of claim 10, wherein the policy attributes include at least two of:
a.) packet loss,
b.) high priority data transfer,
c.) node and/or storage pool name,
d.) performance metrics refresh rate,
e.) using bi-direction hybrid,
f.) using one-way hybrid,
g.) minimum throughput, and
h.) maximum throughput.

13. The system of claim 10, wherein the policy attributes include a time of day during the data transfer.

* * * * *